United States Patent
Kumazaki

(10) Patent No.: US 10,882,530 B2
(45) Date of Patent: Jan. 5, 2021

(54) VEHICLE ALLOCATION SYSTEM

(71) Applicant: TOYOTA JIDOSHA KABUSHIKI KAISHA, Toyota (JP)

(72) Inventor: Kenta Kumazaki, Anjo (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 247 days.

(21) Appl. No.: 16/024,956

(22) Filed: Jul. 2, 2018

(65) Prior Publication Data

US 2019/0039622 A1 Feb. 7, 2019

(30) Foreign Application Priority Data

Aug. 4, 2017 (JP) .................................. 2017-152043

(51) Int. Cl.
*B60W 30/19* (2012.01)
*B60W 20/40* (2016.01)
*G05D 1/02* (2020.01)

(52) U.S. Cl.
CPC ............ *B60W 30/19* (2013.01); *B60W 20/40* (2013.01); *G05D 1/0221* (2013.01); *B60W 2520/10* (2013.01); *G05D 1/021* (2013.01); *G05D 2201/0213* (2013.01)

(58) Field of Classification Search
CPC .. B60W 20/40; B60W 2520/10; B60W 30/19; B60W 2050/0088; B60W 50/0098; B60W 60/0025; G05D 1/021; G05D 1/0221; G05D 2201/0213; B60K 2006/381; B60K 6/365; B60K 6/387; B60K 6/445; B60K 6/547; F16H 2200/0043; F16H 2200/006; F16H 2200/0086; F16H 2200/201; F16H 2200/2023; F16H 2200/2043; F16H 2200/2046; F16H 2200/2097; F16H 3/66; F16H 3/663

See application file for complete search history.

(56) References Cited

U.S. PATENT DOCUMENTS

2011/0077841 A1\* 3/2011 Minami .............. F02D 41/2467
701/104
2018/0335783 A1\* 11/2018 Sweeney ........... B60W 60/0053

FOREIGN PATENT DOCUMENTS

JP H10-208195 A 8/1998
JP 2006-327508 A 12/2006

\* cited by examiner

*Primary Examiner* — Hunter B Lonsberry
*Assistant Examiner* — Matthew J. Reda
(74) *Attorney, Agent, or Firm* — Oliff PLC

(57) ABSTRACT

A vehicle allocation system includes for allocating, through autonomous driving, an allocation vehicle selected from a plurality of selection target vehicles is provided. Each of the plurality of selection target vehicles includes an electronic controller configured to perform hydraulic pressure control learning and autonomous driving control of a power transmission device in which a plurality of shift stages are established by combination of a plurality of hydraulic engaging devices. The at least one processing circuitry is configured to select a vehicle in which a progress degree of the hydraulic pressure control learning is low as the allocation vehicle from the selection target vehicles, based on progress degrees of the hydraulic pressure control learning before the vehicle allocation.

8 Claims, 10 Drawing Sheets

|  | C1 | C2 | B1 | B2 | B3 |
|---|---|---|---|---|---|
| 1st | O |  |  |  | O |
| 2nd | O |  |  | O |  |
| 3rd | O |  | O |  |  |
| 4th | O | O |  |  |  |
| R |  | O |  |  | O |
| N |  |  |  |  |  |

O ENGAGED

|      | C1 | C2 | C3 | C4 | B1 | B2 |
|------|----|----|----|----|----|----|
| P    |    |    |    |    |    |    |
| Rev1 |    |    | O  |    |    | O  |
| Rev2 |    |    |    | O  |    | O  |
| N    |    |    |    |    |    |    |
| 1st  | O  |    |    |    |    | O  |
| 2nd  | O  |    |    |    | O  |    |
| 3rd  | O  |    | O  |    |    |    |
| 4th  | O  |    |    | O  |    |    |
| 5th  | O  | O  |    |    |    |    |
| 6th  |    | O  |    | O  |    |    |
| 7th  |    | O  | O  |    |    |    |
| 8rh  |    | O  |    | O  |    |    |

O: ENGAGED

VEHICLE ALLOCATION SYSTEM

INCORPORATION BY REFERENCE

The disclosure of Japanese Patent Application No. 2017-152043 filed on Aug. 4, 2017 including the specification, drawings and abstract is incorporated herein by reference in its entirety.

BACKGROUND

1. Technical Field

The present disclosure relates to a vehicle allocation system.

2. Description of Related Art

In systems that allocate vehicles equipped with autonomous driving control means from a vehicle allocation center in accordance to an allocation request from a user, an optimal vehicle is selected based on a predetermined criterion, and vehicle allocation is performed. For example, in Japanese Unexamined Patent Application Publication No. 10-208195 (JP1988-208195), an optimal vehicle is selected based on data of features, such as user's learned tastes for vehicles, movement situations of vehicles, traffic situations, and the like.

SUMMARY

By the way, in the vehicle allocation systems of the related art, for example, a vehicle type with a low fuel efficiency is selected in accordance with the movement situations and the traffic situations of vehicles from selection target vehicles selected based on a user's request from the vehicles managed by a vehicle allocation system. Meanwhile, in the power transmission device using the hydraulic engaging devices, for example, in order to correct variations originating from the characteristics or the like of the hydraulic engaging devices when a vehicle begins to be used, learning of hydraulic pressure control for bringing the hydraulic pressure close to an appropriate hydraulic pressure is performed. Particularly in a case where engagement change of the hydraulic engaging devices at the time of shift, that is, clutch-to-clutch shift is executed, a shock may occur due to engagement change of the hydraulic engaging devices. It is known well that the hydraulic pressure control learning of suppressing a shock at the time of shift is performed by learning the engagement pressure of the hydraulic engaging devices in order to suppress the shock at the time of shift. In vehicle allocation systems of the related art, the progress degrees of the hydraulic pressure control learning of the power transmission device are not taken into consideration when a vehicle is allocated, and a possibility that the shock at the time of the shift caused by the hydraulic pressure control learning being insufficient will continue for a long period of time occurs depending on a vehicle. That is, there is a possibility that a state where the progress degrees of the hydraulic pressure control learning of the power transmission device for each vehicle vary may occur. For this reason, a vehicle allocation method, which is effective for equalizing the learning of the hydraulic pressure control of the power transmission device of the vehicle among vehicles and improving the learning in a short time as compared to the related art, has been desired.

The disclosure provides an vehicle allocation system capable of equalizing the progress degrees of hydraulic pressure control learning for suppressing a shock at the time of shift among vehicles and improving the progress degrees of the hydraulic pressure control learning in a short time as compared to the related art.

An aspect of the disclosure relates to a vehicle allocation system. The vehicle allocation system includes for allocating, through autonomous driving, an allocation vehicle selected from a plurality of selection target vehicles. Each of the plurality of selection target vehicles includes an electronic controller configured to perform hydraulic pressure control learning and autonomous driving control of a power transmission device in which a plurality of shift stages are established by combination of a plurality of hydraulic engaging devices. The vehicle allocation system includes at least one processing circuitry configured to select a vehicle in which a progress degree of the hydraulic pressure control learning is low as the allocation vehicle from the selection target vehicles, based on progress degrees of the hydraulic pressure control learning before the vehicle allocation.

In the vehicle allocation system according to the aspect of the disclosure, the at least one processing circuitry may be configured to preferentially allocate a vehicle, in which a progress degree of the hydraulic pressure control learning is high, among the selection target vehicles, as the allocation vehicle when an increased frequency of the hydraulic pressure control learning predicted in a scheduled traveling route is determined to be equal to or less than a predetermined value.

In the vehicle allocation system according to the aspect of the disclosure, the at least one processing circuitry may be configured to preferentially allocate a vehicle, in which a progress degree of the hydraulic pressure control learning in a predetermined shift in high-speed traveling is low, among the selection target vehicles, as the allocation vehicle when the high-speed traveling is determined to be included in a scheduled traveling route. The high-speed traveling may be traveling in which the vehicle travels at a high speed equal to or more than a predetermined speed.

In the vehicle allocation system according to the aspect of the disclosure, the at least one processing circuitry may be configured to preferentially allocate a vehicle, in which a scheduled traveling distance to a vehicle allocation destination is short, in the selection target vehicles, as the allocation vehicle, when the progress degrees of the hydraulic pressure control learning of the selection target vehicles are determined to be the same.

In the vehicle allocation system according to the aspect of the disclosure, the at least one processing circuitry may be configured to determine the progress degrees of the hydraulic pressure control learning based on a ratio of an actual learning frequency and a preset frequency (hereinafter referred to as learning frequency) of the hydraulic pressure control learning.

In the vehicle allocation system according to the aspect of the disclosure, the at least one processing circuitry may be configured to determine the progress degrees of the hydraulic pressure control learning based on a ratio of an actual learning frequency and an average value of learning frequencies of the same type vehicles as the selection target vehicles.

According to the vehicle allocation system related to the aspect of the disclosure, the vehicle allocation system allocates, through autonomous driving, an allocation vehicle selected from a plurality of selection target vehicles, includes at least one processing circuitry configured to select a vehicle in which a progress degree of the hydraulic pressure control learning is low as the allocation vehicle from the selection target vehicles based on progress degrees of the hydraulic pressure control learning before the vehicle allocation. According to the foregoing, it is possible to make the progress degrees of the hydraulic pressure control learning of the power transmission device for suppressing a shock at the time of shift more equal to each other between vehicles and it is possible to improve the progress degrees of the hydraulic pressure control learning in a short time as compared to the related art.

According to the aspect of the disclosure, the at least one processing circuitry may be configured to preferentially allocate the vehicle, in which the progress degree of the hydraulic pressure control learning is high, among the selection target vehicles, as the allocation vehicle when the increased frequency of the hydraulic pressure control learning predicted in the scheduled traveling route is determined to be equal to or less than the predetermined value. According to the foregoing, a vehicle, in which the progress degree of the hydraulic pressure control learning is low, is easily allocated to a vehicle allocation destination in which the learning frequency of the hydraulic pressure control learning predicted in the scheduled traveling route is high. As a result, it is possible to make the progress degrees of the hydraulic pressure control learning of the power transmission device for suppressing a shock at the time of shift equal to each other between vehicles and it is possible to improve the progress degrees of hydraulic pressure control learning in a shorter time as compared to the related art.

According to the aspect of the disclosure, the at least one processing circuitry may be configured to preferentially allocate a vehicle, in which the progress degree of the hydraulic pressure control learning in the predetermined shift in high-speed traveling is low, among the selection target vehicles, as the allocation vehicle when the high-speed traveling in which the vehicle travels at a high speed equal to or more than a predetermined speed to be included in the scheduled traveling route. According to the foregoing, it is possible to make the progress degrees of the hydraulic pressure control learning in the shift in which use frequency is high at high speed more equal to each other between vehicles and it is possible to improve the progress degrees of the hydraulic pressure control learning in a short time as compared to the related art.

According to the aspect of the disclosure, the at least one processing circuitry may be configured to preferentially allocate a vehicle, in which a scheduled traveling distance to a vehicle allocation destination is short, as the allocation vehicle, in a case where the progress degrees of the hydraulic pressure control learning of the selection target vehicles are determined to be the same. According to the foregoing, the progress degrees of the hydraulic pressure control learning at high speed becomes more equal to each other between vehicles, it is possible to improve the progress degrees of the hydraulic pressure control learning in a shorter time as compared to the related art, and the fuel efficiency in traveling to the vehicle allocation destination can be improved.

According to the aspect of the disclosure, the at least one processing circuitry may be configured to determine the progress degrees of the hydraulic pressure control learning based on the ratio of the actual learning frequency and the preset learning frequency. According to the foregoing, it is possible to simply compare the progress degrees of the hydraulic pressure control learning with each other, for example, even in a case where the transitions from the different shift stages to the shift stage are compared with each other.

According to the aspect of the disclosure, the at least one processing circuitry may be configured to determine the progress degrees of the hydraulic pressure control learning based on the ratio of the actual learning frequency and the average value of learning frequencies of the same type vehicles as the selection target vehicles. According to the foregoing, it is possible to simply compare the progress degrees of the hydraulic pressure control learning with each other, for example, even in a case where the transitions from the different shift stages to the shift stage are compared with each other.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
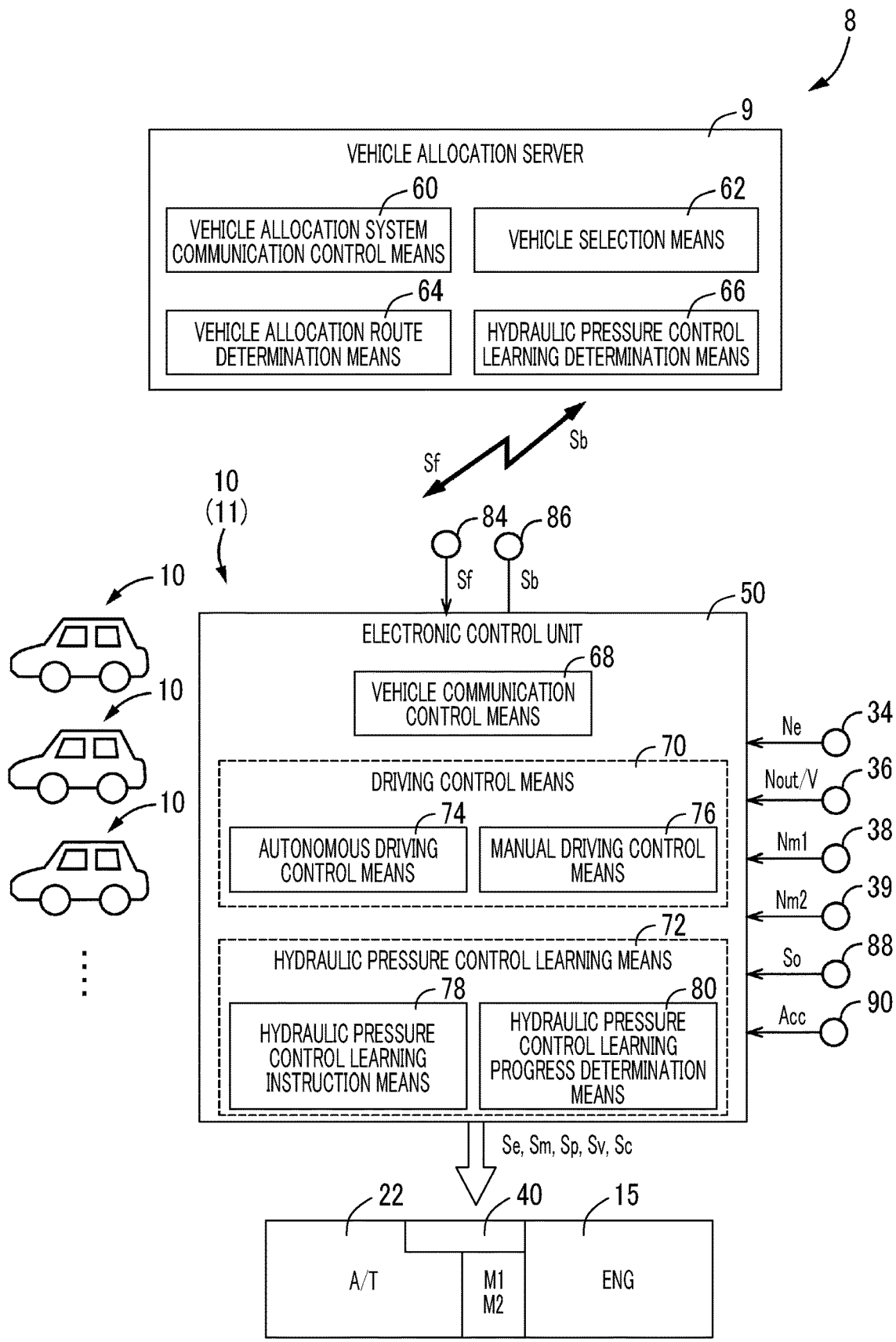
FIG. 1 is a diagram illustrating a schematic configuration of individual parts relating to the traveling of a vehicle to which the disclosure is applied, and illustrating a control system and main parts for control functions for controlling the individual parts.

Hereinafter, embodiments of the disclosure will be described in detail referring to the drawings. In the following embodiments, the drawings are simplified or appropriately modified, and dimensions, shapes, and the like of individual parts are not necessarily drawn accurately.

Embodiment 1

In FIG. 1, a vehicle allocation server 9, a plurality of selection target vehicles 10 selected based on a user's request from vehicles managed by a vehicle allocation system 8, an allocation vehicle 11 selected as a vehicle most suitable for vehicle allocation among the selection target vehicles 10, and an electronic control unit 50 provided in the selection target vehicles 10 and the allocation vehicle 11, which constitute a vehicle allocation system 8 to which the disclosure is applied, are illustrated. The electronic control unit 50 is an example of an electronic controller. When an allocation request from a user is received, the vehicle allocation server 9 selects the allocation vehicle 11 from the selection target vehicles 10 based on a user's use history, a desired vehicle, and the like, and performs vehicle allocation through unmanned autonomous driving. When the user gets on at an appointed location, the allocation vehicle 11 passes through, for example, a route that the user has selected to a destination, or a route that the vehicle allocation server 9 has selected, and see off the user to the destination through manned autonomous driving. The vehicle allocation server 9 performs vehicle allocation based on the progress degree of hydraulic pressure control learning, for example, a learning frequency Le of the hydraulic pressure control learning in clutch-to-clutch shift of hydraulic engaging devices C, B (hereinafter referred to as clutches C, brakes B) of the vehicular power transmission device 12 of each selection target vehicle 10 (hereinafter referred to as a vehicle 10 unless otherwise specified).

Figures 2, 3:
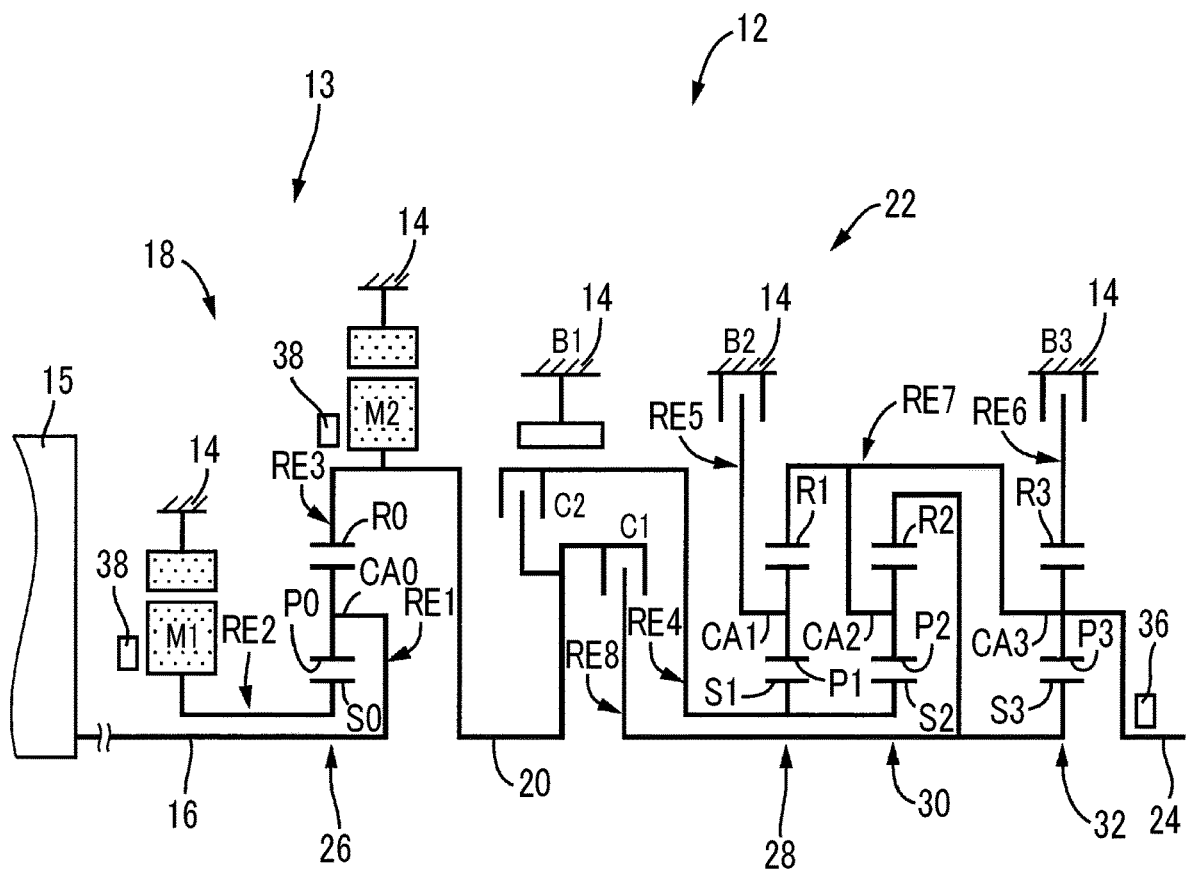
FIG. 2 is a skeleton view illustrating the configuration of a vehicular power transmission device of a hybrid vehicle to which a control device of the disclosure is applied.
FIG. 3 is an operation chart illustrating a combinational relationship between the shift operation of a transmission and the operation of engaging devices used for the shift operation.

FIG. 2 is a skeleton view for illustrating the vehicular power transmission device 12 (hereinafter referred to as "a power transmission device 12") that constitutes a portion of a drive device for a hybrid vehicle to be applied to the vehicle 10. In FIG. 2, the power transmission device 12 includes, in series, an input shaft 16 serving as an input rotating member disposed on a common axis within a transmission case 14 (hereinafter referred to as "a case 14") serving as non-rotating member that is attached to a vehicle body, a differential part 13 serving as a continuously variable transmission part that is directly coupled to the input shaft 16 or indirectly coupled thereto via a pulsation absorption damper (not illustrated), an automatic transmission part 22 that is coupled in series via a transmission member (power transmission shaft) 20 on a power transmission route between the differential part 13 and a drive wheel (not illustrated), and an output shaft 24 serving as an output rotating member that is coupled to the automatic transmission part 22. The power transmission device 12 is suitably used for, for example, a front engine rear drive (FR) type vehicle that is longitudinally installed in the vehicle 10, and is provided between an engine 15, which is, for example, an internal combustion engine, such as a gasoline engine or a diesel engine, as a driving power source for traveling that is directly coupled or indirectly coupled to the input shaft 16 via the pulsation absorption damper (not illustrated), and a pair of drive wheels (not illustrated).

The differential part 13 includes a power distribution mechanism 18 serving as a differential mechanism, which is a mechanical mechanism that mechanically distributes the output of the engine 15 input to the input shaft 16 and which distributes the output of the engine 15 to a first electric motor M1 and a transmission member 20, the first electric motor M1 coupled to the power distribution mechanism 18 so as to be capable of transmitting power, and a second electric motor M2 coupled in operation so as to rotate integrally with the transmission member 20. Although the first electric motor M1 and the second electric motor M2 of Embodiment 1 are so-called motor generators that also have a power generation function, the first electric motor M1 that functions as a differential electric motor for controlling the differential state of the power distribution mechanism 18 includes at least a generator (power generation) function for generating a reaction force. Since the second electric motor M2 coupled to the drive wheels (not illustrated) so as to be capable of transmitting power includes at least a motor (electric motor) function that functions as an electric motor for traveling that outputs driving power as the driving power source for traveling.

The power distribution mechanism 18 is a differential mechanism coupled between the engine 15 and the drive wheels (not illustrated), and is constituted of a single pinion type differential part planetary gear unit 26 as a main constituent. The differential part planetary gear unit 26 includes a differential part sun gear S0, a differential part planetary gear P0, a differential part carrier CA0 that supports the differential part planetary gear P0 in a rotatable and revolvable manner, a differential part ring gear R0 that meshes with the differential part sun gear S0 via the differential part planetary gear P0, as rotating elements (elements).

In the power distribution mechanism 18, the differential part carrier CA0 is coupled to the input shaft 16, that is, the engine 15, the differential part sun gear S0 is coupled to the first electric motor M1, and the differential part ring gear R0 is coupled to the transmission member 20. The power distribution mechanisms 18 configured as mentioned above is brought into a differential state where the differential part sun gear S0, and differential part carrier CA0, and the differential part ring gear R0, which are three elements of the differential part planetary gear unit 26, are respectively made to be rotatable relative to each other, and a differential action is operable, that is, the differential action is exerted. The output of the engine 15 is distributed to the first electric motor M1 and the transmission member 20, and the electrical energy generated from the first electric motor M1 with a portion of the distributed output of the engine 15 is stored as electricity or rotationally drives the second electric motor M2. The differential part 13 (power distribution mechanism 18) is made to function as an electrical differential unit. For example, the differential part 13 is brought into a so-called infinitely variable state (electrical, continuously variable transmission (CVT) state), and the rotation of the transmission member 20 is continuously changed irrespective of predetermined rotation of the engine 15.

The automatic transmission part 22 constitutes a portion of the power transmission route from the differential part 13 to the output shaft 24, and is a multi-stage planetary gear type transmission that includes a single pinion type first planetary gear unit 28, a single pinion type second planetary gear unit 30, and a single pinion type third planetary gear unit 32 and functions as a stepped automatic transmission. The first planetary gear unit 28 includes a first sun gear S1, a first planetary gear P1, a first carrier CA1 that supports the first planetary gear P1 in a rotatable and revolvable manner, and a first ring gear R1 that meshes with the first sun gear S1 via the first planetary gear P1. The second planetary gear unit 30 includes a second sun gear S2, a second planetary gear P2, a second carrier CA2 that supports the second planetary gear P2 in a rotatable and revolvable manner, and a second ring gear R2 that meshes with the second sun gear S2 via the second planetary gear P2. The third planetary gear unit 32 includes a third sun gear S3, a third planetary gear P3, a third carrier CA3 that supports the third planetary gear P3 in a rotatable and revolvable manner, and a third ring gear R3 that meshes with the third sun gear S3 via the third planetary gear P3.

In the automatic transmission part 22, the first sun gear S1 and the second sun gear S2 are integrally coupled to each other, are selectively coupled to the transmission member 20 via the second clutch C2, and are selectively coupled to the case 14 via a first brake B1. The first carrier CA1 is selectively coupled to the case 14 via a second brake B2. The third ring gear R3 is selectively coupled to the case 14 via a third brake B3. The first ring gear R1, the second carrier CA2, and the third carrier CA3 are integrally coupled to each other and are coupled to the output shaft 24. The second ring gear R2 and the third sun gear S3 are integrally coupled to each other and are selectively coupled to the transmission member 20 via the first clutch C1.

In the automatic transmission part 22, for example, as illustrated in an engagement operation table of FIG. 3, the clutch-to-clutch shift is executed by release of a release-side engaging device and engagement of an engagement-side engaging device, and individual gear stages (shift stages) are selectively established. Accordingly, the shift ratio (=Rotation speed of transmission member 20/Rotation speed of output shaft 24) that varies in an approximately equal ratio is obtained for each gear stage.

Figure 4:
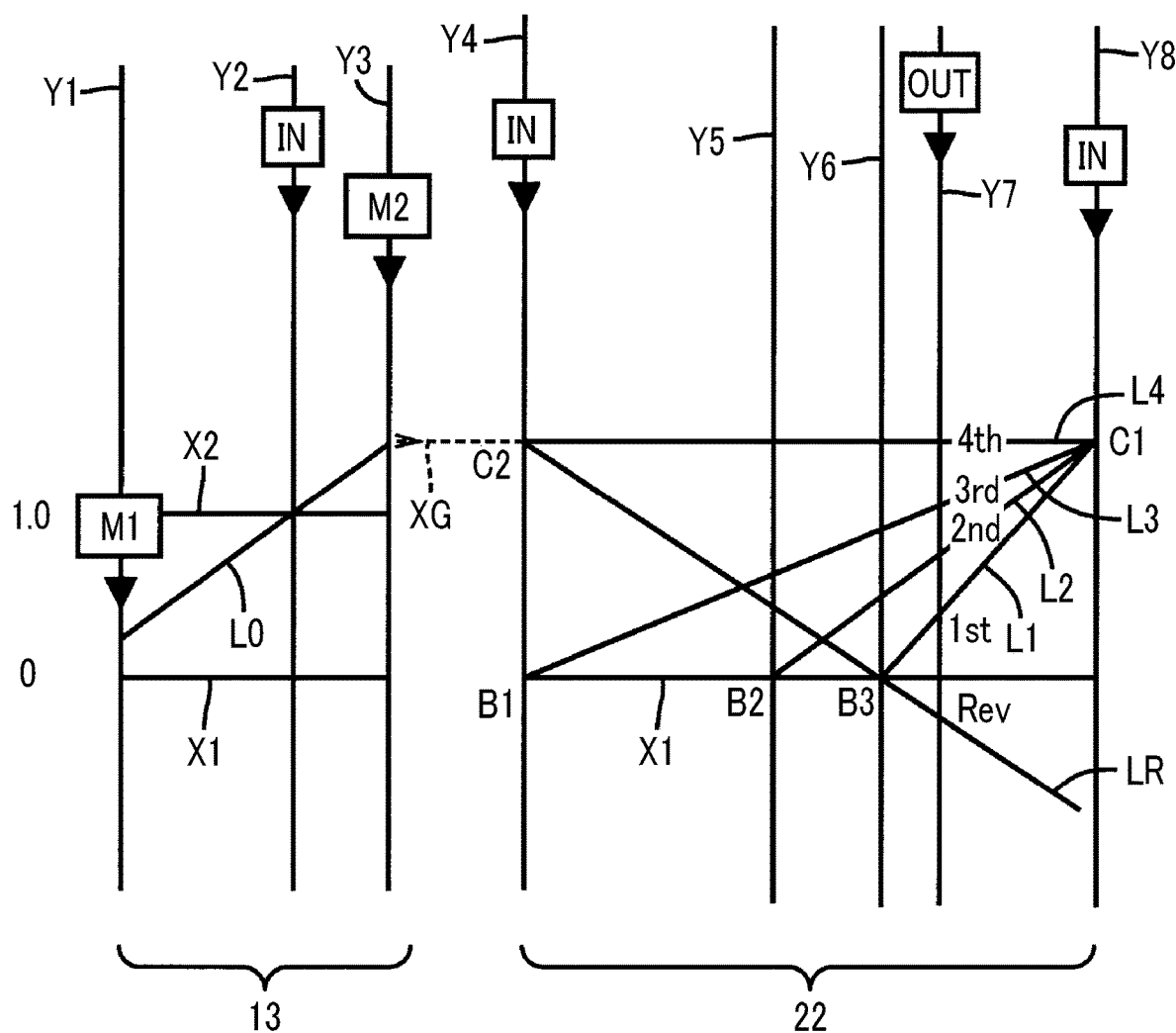
FIG. 4 is a collinear chart illustrating a relative relationship of rotation speeds of individual rotating elements in a transmission equipped with an electrical continuously variable transmission and an automatic transmission.

FIG. 4 illustrates a collinear chart in which a relative relationship between the rotation speeds of the individual rotating elements included in the differential part 13 or the automatic transmission part 22 can be expressed on straight lines, in the power transmission device 12 constituted of the differential part 13 and the automatic transmission part 22. The collinear chart of FIG. 4 is two-dimensional coordinates including a horizontal axis that represents a relationship between the gear ratios of the individual planetary gear units 26, 28, 30, 32, and a vertical axis that represents relative rotation speeds. A horizontal line X1 represents rotation speed zero, a horizontal line X2 represents a rotation speed Ne of the engine 15 coupled to the input shaft 16, and a horizontal line XG represents the rotation speed of the transmission member 20.

Three vertical lines Y1, Y2, Y3 corresponding to the three elements of the power distribution mechanism 18 that constitutes the differential part 13 represent relative rotation speeds of the differential part sun gear S0 corresponding to a second rotating element (second element) RE2, the differential part carrier CA0 corresponding to a first rotating element (first element) RE1, and the differential part ring gear R0 corresponding to a third rotating element (third element) RE3, in order from the left side. The intervals of the vertical lines Y1, Y2, Y3 are determined in accordance with to the gear ratios of the differential part planetary gear unit 26. Five vertical lines Y4, Y5, Y6, Y7, Y8 of the automatic transmission part 22 respectively represent the first sun gear S1 and the second sun gear S2 that correspond to a fourth rotating element (fourth element) RE4 and are coupled to each other, the first carrier CA1 corresponding to a fifth rotating element (fifth element) RE5, the third ring gear R3 corresponding to a sixth rotating element (sixth element) RE6, the first ring gear R1, the second carrier CA2, and the third carrier CA3 that correspond to a seventh rotating element (seventh element) RE7 and are coupled to each other, and the second ring gear R2 and the third sun gear S3 that correspond to an eighth rotating element (eighth element) RE8, and are coupled to each other, sequentially from the left. The intervals of the vertical lines Y4, Y5, Y6, Y7, Y8 are respectively determined in accordance with the gear ratios of the first, second, and third planetary gear units 28, 30, 32.

Figure 5:
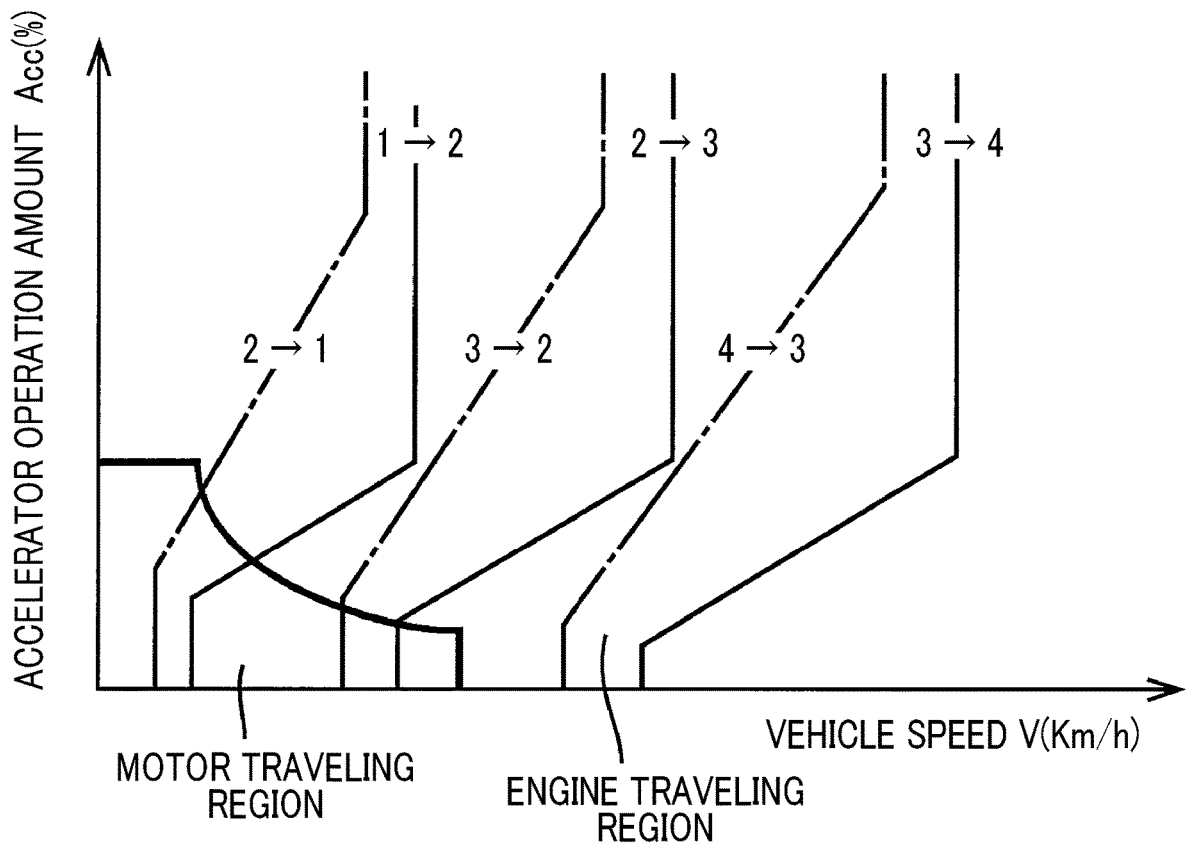
FIG. 5 is a graph illustrating an example of a shift map used for the shift control of the automatic transmission, and a power source switching map used for the switching control between engine traveling and motor traveling, and illustrating a relationship between these maps.

In FIG. 5, whether or not shift should be executed based on an actual vehicle speed V and an accelerator operation amount Acc, from a relationship (a shift diagram, a shift map) having upshift lines (solid lines) and downshift lines (one-dot chain lines) that are stored in progress with a vehicle speed V (km/h) and an accelerator operation amount Acc (%) as variables. Motor traveling is executed in a low vehicle-speed region where engine efficiency generally inclines and the vehicle speed V illustrated as a thick solid line is relatively low or in a low load region where the accelerator operation amount Acc is relatively low. During the aforementioned motor traveling, in order to suppress dragging of the stopped engine 15 to improve fuel efficiency, the engine 15 is idled by controlling a first electric motor rotation speed Nm1 at a negative rotation speed, for example, to bring the first electric motor M1 into an unloaded state, and the engine rotation speed Ne is maintained at zero or substantially zero as needed by the electrical CVT function (differential action) of the differential part 13.

Referring back FIG. 1, the vehicle 10 includes the electronic control unit 50 including a traveling control device that controls individual parts relating to traveling. The electronic control unit 50 is configured to include, for example, a so-called microcomputer equipped with a central processing unit (CPU), a random access memory (RAM), a read only memory (ROM), an input/output interface, and the like. The CPU executes various kinds of control of the vehicle 10 by performing signal processing in accordance with a program stored in progress in the ROM, using a temporary storage function of the RAM. For example, the electronic control unit 50 is adapted to execute vehicle control, such as hybrid drive control regarding the engine 15, the first electric motor M1, the second electric motor M2, and the like, and is configured to include individual computers for engine control, for rotating machine control, for hydraulic pressure control, and the like as needed.

Data signals Sf, such as big data from the vehicle allocation server 9, which is received by a receiver 84, a signal Nm1 showing the rotation speed and the rotational direction of the first electric motor M1 that are detected by a rotation speed sensor, such as a resolver 38, a signal Nm2 showing the rotation speed and the rotational direction of the second electric motor M2 that are detected by the rotation speed sensor 39, such as a resolver, a signal Ne showing the rotation speed of the engine 15 detected by an engine speed sensor 34, a signal showing the vehicle speed V and the traveling direction of a vehicle corresponding to a rotation speed Nout of the output shaft 24 detected by a vehicle speed sensor 36, a signal So of an obstacle sensor 88 or the like, such as a millimeter wave RADAR or a TV camera, which detects a front obstacle, a throttle valve opening degree signal detected by a throttle valve opening degree sensor 90, and the like are respectively supplied to the electronic control unit 50.

A signal Sb transmitted from a transmitter 86 to the vehicle allocation server 9, a signal for controlling the engine 15, for example, a control signal Se for controlling engine output, specifically, an opening degree signal of an electronic throttle valve of the engine 15, a supercharging pressure adjustment signal for adjusting supercharging pressure, an ignition signal for commanding the ignition timing of the engine 15, and the like are output from the electronic control unit 50. A command signal Sm for commanding the operation of the electric motors M1 and M2, a shift position (operative position) signal Sp, a valve command signal Sv for actuating an electromagnetic valve included in an hydraulic pressure control circuit 40 in order to control the clutches C of the differential part 13 or the automatic transmission part 22 and a hydraulic actuator of the brake B, and an acceleration/deceleration, steering, and braking signal Sc in autonomous driving are respectively output.

Figure 6:
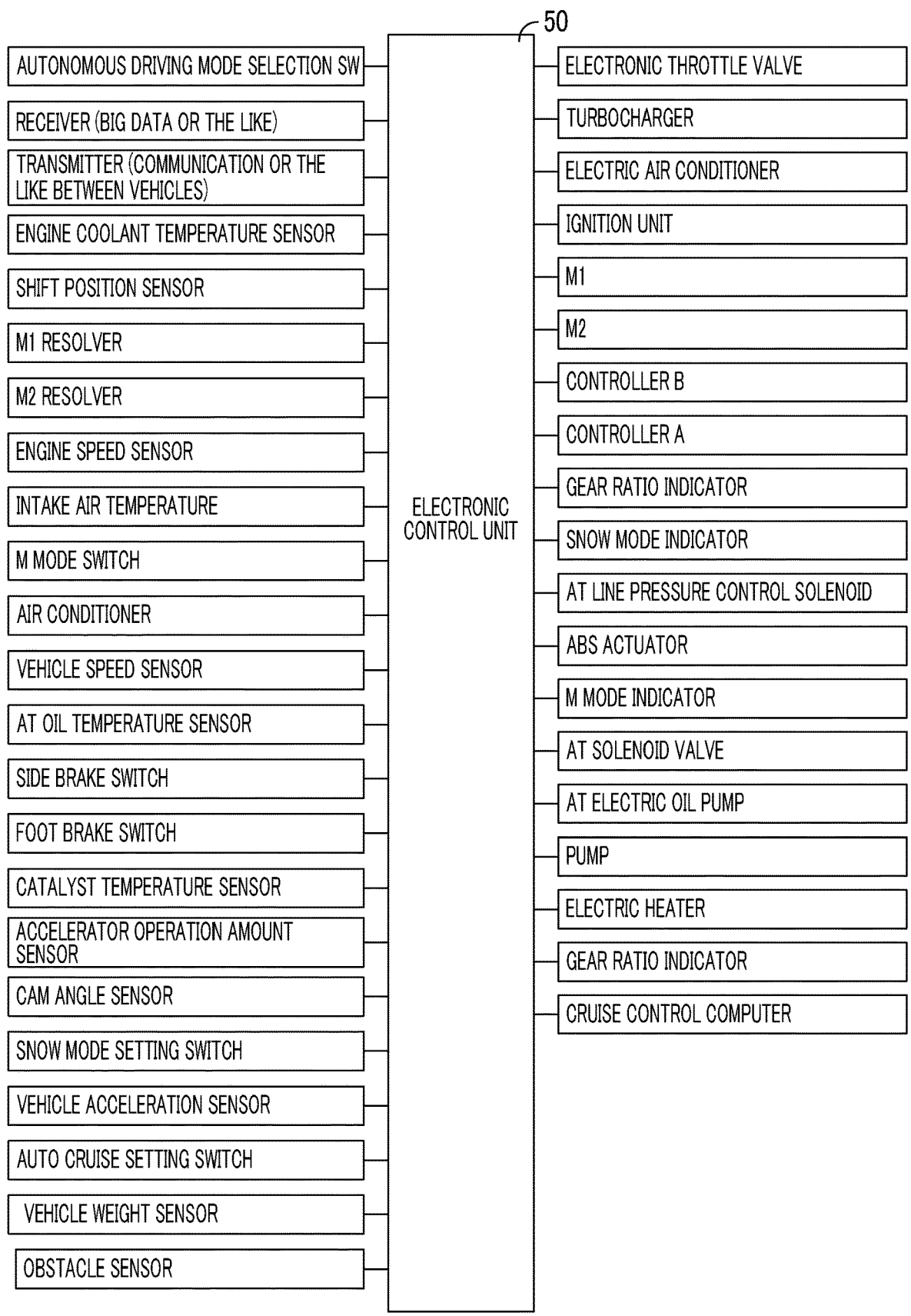
FIG. 6 is a diagram illustrating input/output signals of an electronic control unit provided in the vehicular power transmission device of FIG. 1.

In addition to the above, various signals are input to and output from the electronic control unit 50. For example, an autonomous driving mode selection switch signal, a signal showing engine coolant temperature, a signal showing a shift position, a signal showing intake air temperature, a signal for commanding an M mode (manual shift traveling mode), an air conditioner signal showing the operation of an air conditioner, an oil temperature signal showing the operating oil temperature of the automatic transmission part 22, a signal showing parking brake operation, a signal showing foot brake operation, a catalyst temperature signal showing catalyst temperature, a cam angle signal, a snow mode setting signal showing snow mode setting, an acceleration signal showing the forward and backward acceleration of a vehicle, an auto-cruise signal showing auto-cruise traveling, a vehicle weight signal showing the weight of a vehicle, and the like are respectively supplied from the individual sensors, switches, and the like illustrated in FIG. 6. Signals to an electric air conditioner, various indicators, an electric oil pump, an electric heater, and a cruise control computer, and the like are respectively output from the electronic control unit 50.

Referring back to FIG. 1, main parts for the functions of selecting and allocating the allocation vehicle 11 based on the user's request in the vehicle allocation system 8 are illustrated in the vehicle allocation server 9 of the vehicle allocation system 8. The vehicle allocation server 9 includes vehicle allocation system communication control means 60, vehicle selection means 62, vehicle allocation route determination means 64, and hydraulic pressure control learning determination means 66, as the main parts for the control functions thereof. The main parts for the electronic control functions of transporting the user through the autonomous driving and executing the hydraulic pressure control learning of the power transmission device 12 are illustrated in the vehicle 10. The electronic control unit 50 includes vehicle communication control means 68, driving control means 70 surrounded by a dashed line, and hydraulic pressure control learning means 72 surrounded by a dotted line. The driving control means 70 surrounded by the dashed line has autonomous driving control means 74 that execute the autonomous driving, and manual driving control means 76. The hydraulic pressure control learning means 72 surrounded by the dotted line has hydraulic pressure control learning instruction means 78 and hydraulic pressure control learning progress determination means 80. The vehicle allocation server 9 includes a transceiver (not illustrated), and the vehicle allocation server 9 and the vehicle 10 exchange information with each other based on bidirectional communication signals Sf, Sb.

In the vehicle allocation server 9, when the vehicle allocation system communication control means 60 receives the allocation request from the user, the vehicle selection means 62 selects a vehicle from vehicles managed the vehicle allocation system capable of allocating the selection target vehicles 10 relating to, for example, vehicle rank, size, color, fuel efficiency performance, and the like, based on the user's request and the user's use history. The vehicle allocation route determination means 64 determines a scheduled traveling route. That is, a route of a vehicle to a user's waiting location and a route from a destination to a waiting location of the vehicle are determined. In a case where a route from the user's waiting location to the destination is not set by the user or in a case where an appointed route is unsuitable for a certain reason, the route to the destination is set. The hydraulic pressure control learning determination means 66 selects, as the allocation vehicle 11, a vehicle in which the hydraulic pressure control learning does not progress most among the selection target vehicles 10 selected by the vehicle selection means 62, based on the learning frequency Le of the hydraulic pressure control learning for each shift in the clutch-to-clutch shift of the clutches C and the brakes B of the power transmission device 12. The hydraulic pressure control learning determination means 66 holds progress degrees d1 of the newest hydraulic pressure control learning of all the vehicles by receiving the communication signal Sf transmitted from the allocation vehicle 11 in a case where a change occurs in the hydraulic pressure control learning. In a case where the progress degrees d1 of the hydraulic pressure control learning are the same, a vehicle in which a traveling distance from a vehicle allocation location, which is the waiting location of each vehicle 10, to a vehicle allocation destination is short is selected. The vehicle allocation system communication control means 60 performs an allocation instruction on the allocation vehicle 11 selected by the communication signal Sf, based on the instruction of the hydraulic pressure control learning determination means 66.

When the allocation vehicle 11 receives an allocation instruction, that is, an output signal Sf, which is output via the receiver 84 from the vehicle allocation server 9, using the vehicle communication control means 68 of the electronic control unit 50, the driving control means 70 selects the autonomous driving control means 74 from the autonomous driving control means 74 and the manual driving control means 76, and starts autonomous driving of the allocation vehicle 11. As the autonomous driving of a vehicle, there are manned driving with an occupant, and unmanned driving with no occupant. In the manned driving, for example, there is a case where the amenity of an occupant, such as suppressing a shock in the clutch-to-clutch shift, is needed in addition to occupant's safety, and the contents needed for the autonomous driving are somewhat different from those of the unmanned driving with no occupant. Whether manned or unmanned is determined depending on, for example, determination by a sensor installed in a seat of a vehicle, selection by a panel (not illustrated) provided in a vehicle, whether or not there is remote control in a remote mode, or the like. When get-on of the user and see-off to a destination are completed, for example, when the allocation vehicle 11 returns to and stops in the vehicle allocation location that is the waiting location, the hydraulic pressure control learning progress determination means 80 determines the progress degrees d1 of the hydraulic pressure control learning of the clutches C and the brakes B for each shift in the clutch-to-clutch shift of the clutches C and the brakes B of the power transmission device 12, and distributes determination results to the vehicle allocation system 8 via the vehicle communication control means 68. The hydraulic pressure control learning determination means 66 holds the determination results as the newest hydraulic pressure control learning data of the clutches C and the brakes B of the allocation vehicle 11. The hydraulic pressure control learning instruction means 78 corrects a hydraulic pressure control instruction values of the hydraulic pressures of the clutches C and the brakes B to corrected values when the learning of the hydraulic pressure control is performed, and provides an instruction for the corrected values in the next shift.

Friction materials used for the clutches C and the brakes B of the power transmission device 12 of a vehicle have individual differences, such as variations or time-dependent changes in frictional coefficient, and dimensional differences of pressure-receiving parts, and these generate a shock in the clutch-to-clutch shift. For this reason, whenever shift of the power transmission device 12 is performed, well-known hydraulic pressure control learning in which the hydraulic pressure control instruction value of the hydraulic pressure is corrected is performed based on the shift result of the power transmission device 12. As the hydraulic pressure control learning, for example, a method of calculating a correction value from a change in the rotation speed of the input shaft 16 of the power transmission device 12 after the hydraulic pressure control is started is used. The progress degrees d1 of the hydraulic pressure control learning can be expressed based on the frequency at which the hydraulic pressure control learning is performed. For example, the learning frequency Le on which the hydraulic pressure control learning in the clutch-to-clutch shift of the clutches C and the brakes B converges, that is, a learning frequency Le1 at which a shock caused due to the shift becomes equal to or lower than a predetermined magnitude is experimentally obtained in progress for each shift, and an actual shift execution frequency Le is divided by a predetermined frequency Le1 on which the hydraulic pressure control learning converges. It is possible to compare the progress degrees d1 of the hydraulic pressure control learning of the clutches C and the brakes B in the clutch-to-clutch shift and the hydraulic pressure control learning in different vehicles 10 with each other depending on how much the hydraulic pressure control learning has converged. A progress degrees d1 in the shift in which the hydraulic pressure control learning does not progress most in the clutch-to-clutch shift can be used for the comparison between the progress degrees d1 of the hydraulic pressure control learning. For example, a value obtained by averaging the progress degrees d1 in a plurality of shifts in which the progress degrees d1 of the hydraulic pressure control learning are low can also be used for the comparison of the progress degrees. Regarding the progress degrees d1 of the hydraulic pressure control learning, the progress degrees d1 of the hydraulic pressure control learning can also be compared with each other also depending on, for example, the magnitude of the learning correction amount of the control instruction value of the hydraulic pressure for each hydraulic pressure control learning. Since the correction amount of the control instruction value of the hydraulic pressure decreases as the hydraulic pressure control learning progresses, it is also possible to measure the progress degrees depending on the magnitude of the learning correction amount of the control instruction value.

Figure 7:
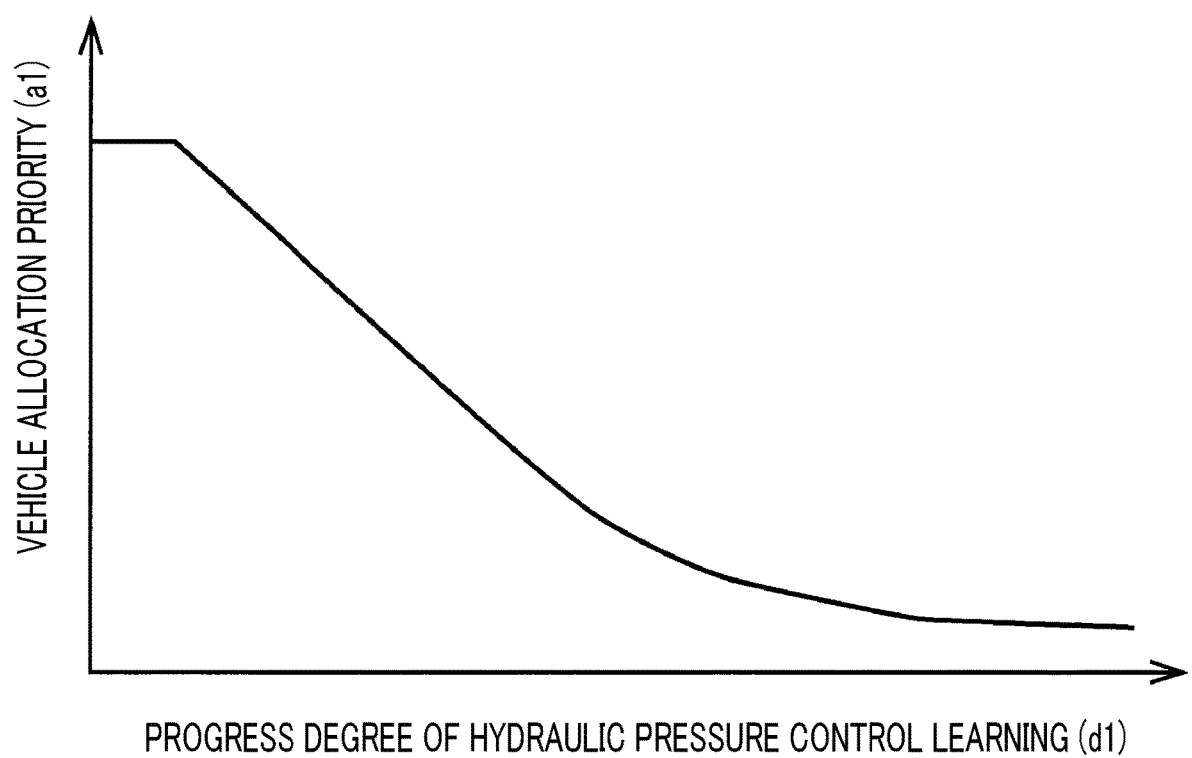
FIG. 7 is a graph illustrating a relationship between the hydraulic pressure control learning progress degree of the vehicle of FIG. 1 and the vehicle allocation priority of a vehicle allocation system.

FIG. 7 is an example illustrating a relationship of vehicle allocation priorities a1 with respect to the progress degrees d1 of the hydraulic pressure control learning when the progress degrees d1 of the hydraulic pressure control learning of the clutches C and the brakes B, that is, values by dividing the learning frequency Le for each shift of the clutches C and the brakes B in the clutch-to-clutch shift by a preset frequency Le1 on which the hydraulic pressure control learning converges are taken as a horizontal axis. The vehicle allocation priorities a1 are set so as to be high when the progress degrees d1 of the hydraulic pressure control learning are low, that is, the hydraulic pressure control learning is started, and so as to quickly decrease with the progress degrees d1 of the hydraulic pressure control learning. That is, it is reflected that a shock in the clutch-to-clutch shift is large when the hydraulic pressure control learning is started and the shock in the clutch-to-clutch shift quickly decreases with the progress of the hydraulic pressure control learning. As the progress degrees d1 of the hydraulic pressure control learning when the allocation vehicle 11 is selected, the vehicle allocation priorities a1 can also be used instead of the progress degrees d1 calculated using the learning frequency Le. According to the foregoing, it is possible to select the allocation vehicle 11 based on the magnitude of a shock in the clutch-to-clutch shift, and it is possible to use the vehicle allocation priorities a1 for comparison with other selection items. For example, by setting individual vehicle allocation priorities depending on the colors of vehicles that are user's tastes, the traveling distances of the individual vehicles 10, and the like, comparison with factors other than the vehicle allocation priorities of the hydraulic pressure control learning becomes easy, and the vehicles 10 can be used as means to be selected from various factors.

Figure 8:
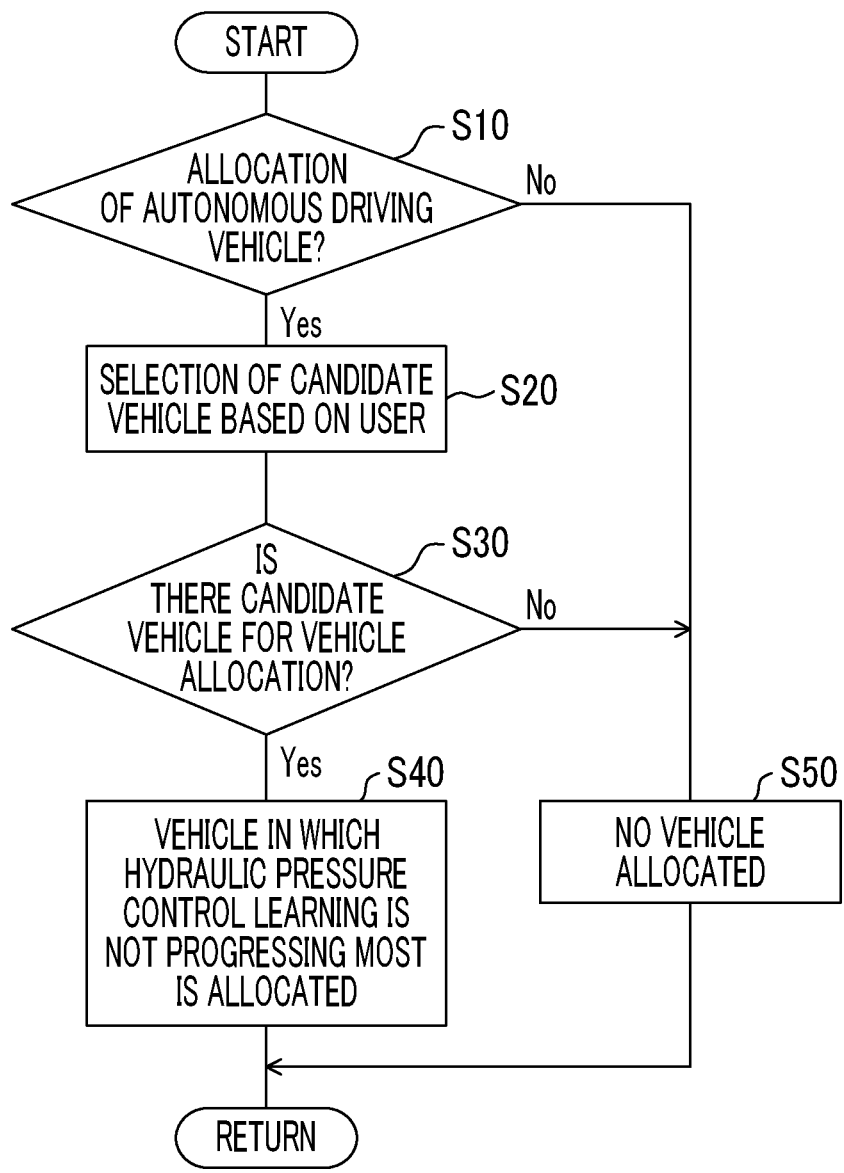
FIG. 8 is a flowchart illustrating a case where vehicle allocation is performed based on the hydraulic pressure control learning progress degree of FIG. 7.

FIG. 8 is a flowchart illustrating control operation in which the allocation vehicle 11 is selected based on the hydraulic pressure control learning of the clutches C and the brakes B by a main part of the control operation of the electronic control unit 50, that is, the vehicle allocation system 8, and the control operation is repeated executed.

In FIG. 8, in Step (hereinafter, Steps are omitted) S10 corresponding to the vehicle selection means 62 of the vehicle allocation system 8, whether there is an allocation request for an autonomous driving vehicle from a user is determined. In a case where determination of S10 is denied, that is, in a case where the allocation request is not for the autonomous driving vehicle, vehicle allocation is not performed in S50 corresponding to the vehicle selection means 62. In a case where the determination of S10 is affirmed, in S20 corresponding to the vehicle selection means 62, candidate vehicles, that is, the selection target vehicles 10, are selected based on the user's request and the stored user's use history that are acquired via the vehicle allocation system communication control means 60. In S30 corresponding to the vehicle selection means 62, in a case where there is no candidate vehicle 10, that is, no selection target vehicle 10 for vehicle allocation, the vehicle allocation is not performed in S50 corresponding to the vehicle selection means 62. In S30 corresponding to the vehicle selection means 62, in a case where there are candidate vehicles 10 for vehicle allocation, the progress degrees d1 of the hydraulic pressure control learning of the clutches C and the brakes B are evaluated for each candidate vehicle 10 in S40 corresponding to the vehicle allocation route determination means 64, the hydraulic pressure control learning determination means 66, and the vehicle selection means 62. A vehicle in which the hydraulic pressure control learning does not progress most is evaluated as a vehicle in which the vehicle allocation priority is the highest compared to other vehicles, and is allocated as the allocation vehicle 11. Regarding the progress degrees d1 of the hydraulic pressure control learning, the progress degrees d1 of the hydraulic pressure control learning of the clutches C or the brakes B in the shift in which the hydraulic pressure control learning does not progress most are used for comparison between vehicles. As mentioned above, the hydraulic pressure control learning, the vehicle allocation priorities a1 may be used instead of the progress degrees d1. In the selection target vehicles 10, in a case where the progress degrees d1 of the hydraulic pressure control learning are determined to be the same, a vehicle in which a scheduled traveling distance to the vehicle allocation destination is short may be preferentially selected as the allocation vehicle 11.

According to Embodiment 1, in the vehicle allocation system 8 that allocates, through the autonomous driving, the allocation vehicle 11 selected from the selection target vehicles 10 having the hydraulic pressure control learning means 72 that performs the hydraulic pressure control learning and the autonomous driving control means 74 that performs the autonomous driving, in the power transmission device 12 in which the shift stages are formed by combination of the clutches C and the brakes B, a vehicle 10 in which the progress degree d1 of the hydraulic pressure control learning is low is selected as the allocation vehicle 11 from the selection target vehicles 10 based on the progress degrees d1 of the hydraulic pressure control learning before the vehicle allocation. According to the foregoing, it is possible to make the progress degrees d1 of the hydraulic pressure control learning of the power transmission device 12 for suppressing a shock at the time of shift more equal to each other between vehicles and it is possible to improve the progress degrees d1 of the hydraulic pressure control learning in a short time as compared to the related art.

According to Embodiment 1, in the selection target vehicles 10, in a case where the progress degrees d1 of the hydraulic pressure control learning are determined to be the same, a vehicle in which a scheduled traveling distance to the vehicle allocation destination is short may be preferentially allocated as the allocation vehicle 11. According to the foregoing, the progress degrees d1 of the hydraulic pressure control learning becomes more equal to each other between vehicles, it is possible to improve the progress degrees d1 of the hydraulic pressure control learning in a shorter time as compared to the related art, and the fuel efficiency in traveling to the vehicle allocation destination can be improved.

According to Embodiment 1, the progress degrees d1 of the hydraulic pressure control learning are determined based on the ratio of the actual learning frequency Le and the preset learning frequency Le1. According to the foregoing, it is possible to simply compare the progress degrees d1 of the hydraulic pressure control learning with each other, for example, even in a case where transitions from different shift stages to a shift stage are compared with each other.

Other embodiments of the disclosure will be described. In the subsequent description, the parts shared by the aforementioned embodiment will be designated by the same reference signs and the description thereof will be omitted.

Embodiment 2

Embodiment 2 is different from the aforementioned embodiment in that a vehicle in which the hydraulic pressure control learning is progressing is allocated in a case where an increased number Lei of the learning frequency Le of the hydraulic pressure control learning in the scheduled traveling route of each vehicle 10, that is, a shift frequency predicted in the scheduled traveling route is equal to or less than a learning frequency increase determination value Lei1. The others are the same as those of the aforementioned embodiment.

Figure 9:
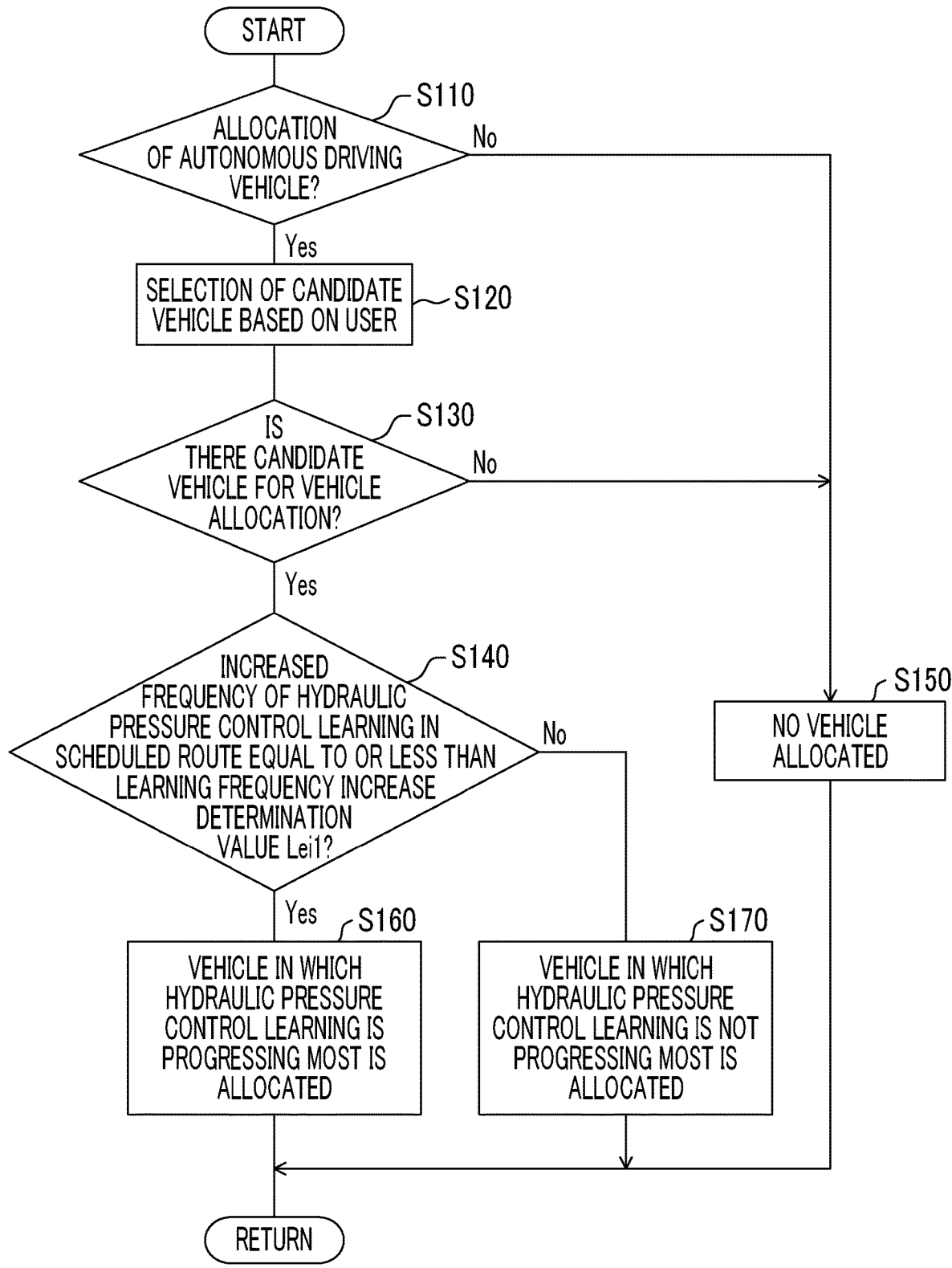
FIG. 9 is a flowchart illustrating a case where determination is performed by further adding the increased frequency of hydraulic pressure control learning on a scheduled vehicle allocation route to determination of the vehicle allocation of FIG. 8.

A case where the increased number Lei of the learning frequency Le of the hydraulic pressure control learning in the scheduled traveling route is taken into consideration during vehicle allocation is illustrated in FIG. 9. In Step (hereinafter, Steps are omitted) S110 corresponding to the vehicle selection means 62 of the vehicle allocation system 8, whether there is an allocation request for an autonomous driving vehicle from a user is determined. In a case where determination of S110 is denied, that is, in a case where the allocation request is not for the autonomous driving vehicle, vehicle allocation is not performed in the vehicle selection means 62 corresponding to S150. In a case where the determination of S110 is affirmed, in S120 corresponding to the vehicle selection means 62, candidate vehicles 10, that is, the selection target vehicles 10, are selected based on the user's request and the stored user's use history that are acquired via the vehicle allocation system communication control means 60. In S130 corresponding to the vehicle selection means 62, in a case where there is no candidate vehicle 10 for vehicle allocation, the vehicle allocation is not performed in the vehicle selection means 62 corresponding to S150. In S130 corresponding to the vehicle selection means 62, in a case where there are candidate vehicles 10 for vehicle allocation, in S140 corresponding to the vehicle allocation route determination means 64, whether or not the increased number Lei of the learning frequency Le of the hydraulic pressure control learning, that is, the predicted shift frequency in the scheduled traveling route, that is, in allocation of each vehicle 10 to the user, movement of the user to a destination, a movement route up to the vehicle allocation location that is the waiting location of the vehicle 10 is equal to or less than the learning frequency increase determination value Lei1 is determined. In a case where determination of S140 is affirmed, in S160 corresponding to the vehicle allocation route determination means 64, the hydraulic pressure control learning determination means 66, and the vehicle selection means 62, the progress degrees d1 of the hydraulic pressure control learning of the clutches C and the brakes B are evaluated for each candidate vehicle 10, and a vehicle 10 in which the hydraulic pressure control learning is progressing most is selected. In a case where the determination of S140 is denied, in S170 corresponding to the vehicle allocation route determination means 64, the hydraulic pressure control learning determination means 66, and the vehicle selection means 62, a vehicle 10 in which the hydraulic pressure control learning does not progress most is allocated. In a case where the progress degrees d1 of the hydraulic pressure control learning are the same, a vehicle in which the traveling distance from the vehicle allocation location, which is the waiting location of each vehicle 10, to the vehicle allocation destination is short is selected.

According to Embodiment 2, in a case where the increased number Lei of the learning frequency Le of the hydraulic pressure control learning predicted in the scheduled traveling route is determined to be equal to or less than a predetermined value, that is, the learning frequency increase determination value Lei1, a vehicle 10, in which the progress degree d1 of the hydraulic pressure control learning is high, among the selection target vehicles 10, is preferentially allocated as the allocation vehicle 11. According to the foregoing, a vehicle, in which the progress degree d1 of the hydraulic pressure control learning is low, is easily allocated to the vehicle allocation destination of the scheduled traveling route in which the increased number Lei of the learning frequency Le of the hydraulic pressure control learning predicted in the scheduled traveling route is large, that is, the shift frequency is high. As a result, it is possible to make the progress degrees d1 of the hydraulic pressure control learning of the power transmission device 12 for suppressing a shock at the time of shift equal to each other between vehicles and it is possible to improve the progress degrees d1 of hydraulic pressure control learning in a shorter time as compared to the related art.

Other embodiments of the disclosure will be described. In the subsequent description, the parts shared by the aforementioned embodiment will be designated by the same reference signs and the description thereof will be omitted.

Embodiment 3

Embodiment 3 is different from the aforementioned Embodiment 1 in that a vehicle in which the progress degree d1 of the hydraulic pressure control learning in a predetermined shift in high-speed traveling equal to or more than a high-speed determination value V1 is low is preferentially allocated in a case where determination is performed that the high-speed traveling equal to or more than the high-speed determination value V1 that is a determination value of speed is included in the scheduled traveling route. The others are the same as those of the aforementioned Embodiment 1.

Figure 10:
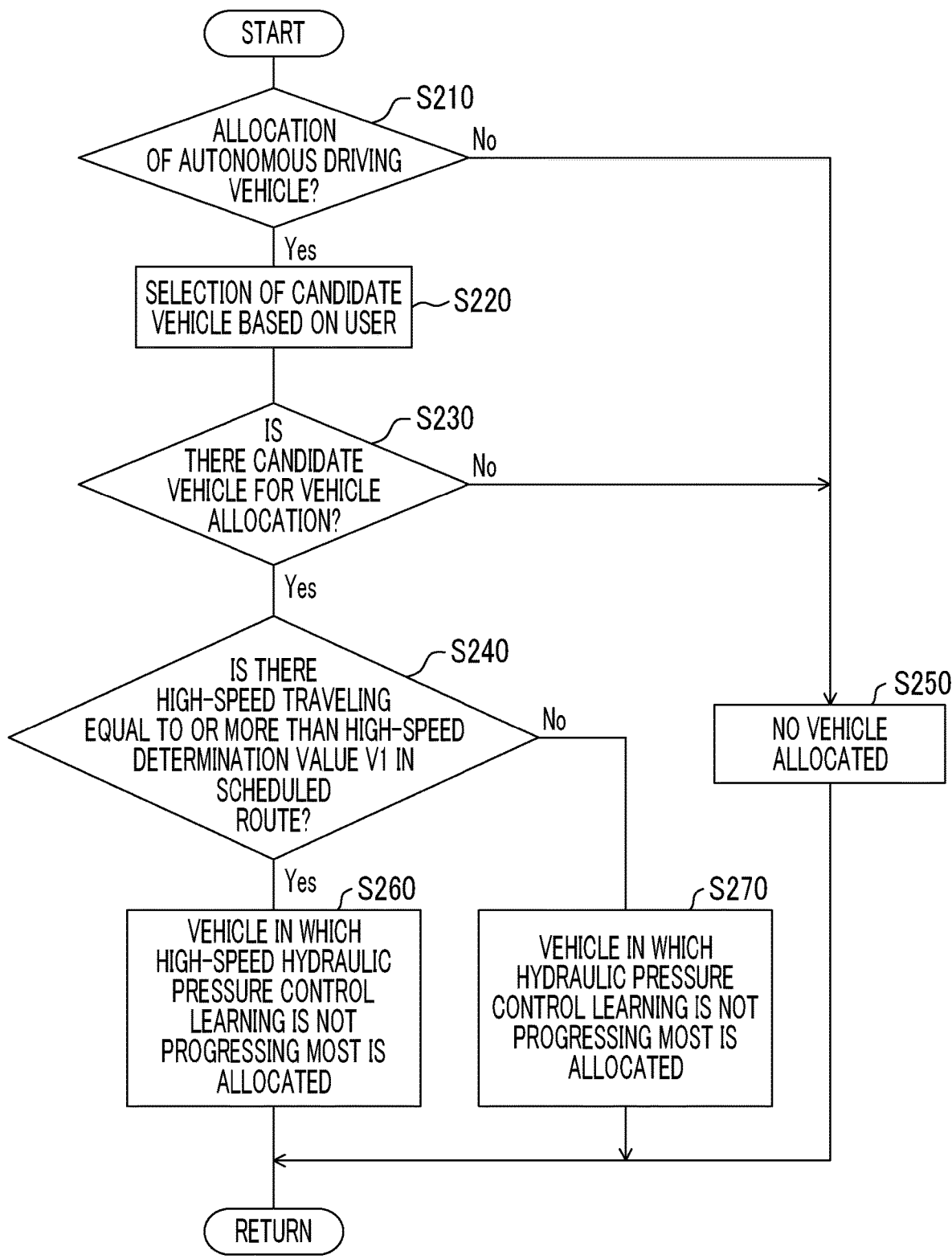
FIG. 10 is a flowchart illustrating a case where determination is performed by further adding the presence/absence of high-speed traveling on a scheduled vehicle allocation route to determination of the vehicle allocation of FIG. 8.

A case where whether the high-speed traveling equal to or more than the high-speed determination value V1 is included in the scheduled traveling route is taken into consideration at the time of vehicle allocation is illustrated in FIG. 10. In Step (hereinafter, Steps are omitted) S210 corresponding to the vehicle selection means 62 of the vehicle allocation system 8, whether there is an allocation request for an autonomous driving vehicle from a user is determined. In a case where determination of S210 is denied, that is, in a case where the allocation request is not for the autonomous driving vehicle, vehicle allocation is not performed in the vehicle selection means 62 corresponding to S250. In a case where the determination of S210 is affirmed, in S220 corresponding to the vehicle selection means 62, candidate vehicles 10, that is, the selection target vehicles 10, are selected based on the user's request and the stored user's use history that are acquired via the vehicle allocation system communication control means 60. In S230 corresponding to the vehicle selection means 62, in a case where there is no candidate vehicle 10 for vehicle allocation, the vehicle allocation is not performed in the vehicle selection means 62 corresponding to S250. In S230 corresponding to the vehicle selection means 62, in a case where there are candidate vehicles 10 for vehicle allocation, in S240 corresponding to the vehicle allocation route determination means 64, whether or not there is any high-speed traveling equal to or more than the high-speed determination value V1 in the scheduled traveling route, that is, in allocation of the vehicle 10 to the user, movement of the user to a destination, a movement route up to the vehicle allocation location that is the waiting location of each vehicle 10 is determined. In a case where determination of S240 is affirmed, in S260 corresponding to the vehicle allocation route determination means 64, the hydraulic pressure control learning determination means 66, and the vehicle selection means 62, the progress degrees d1 of the hydraulic pressure control learning in a predetermined shift are evaluated for each candidate vehicle 10, and a vehicle in which the high-speed hydraulic pressure control learning does not progress most is selected as the allocation vehicle 11. In a case where the determination of S240 is denied, in S270 corresponding to the vehicle allocation route determination means 64, the hydraulic pressure control learning determination means 66, and the vehicle selection means 62, a vehicle in which the hydraulic pressure control learning does not progress most is allocated as the allocation vehicle 11. In a case where the progress degrees d1 of the hydraulic pressure control learning are the same, a vehicle in which the traveling distance from the vehicle allocation location, which is the waiting location of each vehicle 10, to the vehicle allocation destination is short is selected.

According to Embodiment 3, a vehicle, in which the progress degree d1 of the hydraulic pressure control learning in a predetermined shift in the high-speed traveling equal to or more than the high-speed determination value V1 is low, among the selection target vehicles 10, is preferentially allocated as the allocation vehicle 11 in a case where determination is performed that the high-speed traveling equal to or more than the high-speed determination value V1 is included in the scheduled traveling route. According to the foregoing, it is possible to make the progress degrees d1 of the hydraulic pressure control learning in a shift in which use frequency is high at high speed more equal to each other between vehicles and it is possible to improve the progress degrees d1 of the hydraulic pressure control learning in a short time as compared to the related art.

Other embodiments of the disclosure will be described. In the subsequent description, the parts shared by the aforementioned embodiment will be designated by the same reference signs and the description thereof will be omitted.

Embodiment 4

In the aforementioned Embodiments 1 to 3, the progress degrees d1 of the hydraulic pressure control learning are determined by dividing the learning frequency Le for each shift in the clutch-to-clutch shift by the shift frequency Le1 set in advance for each shift. However, the disclosure is not particularly limited to this. For example, there is a difference in that the progress degrees d1 of the hydraulic pressure control learning are determined based on a ratio between the actual learning frequency Le and an average value Leav of the learning frequencies Le of the same type vehicles as the selection target vehicles 10. Data of the same type vehicles the selection target vehicles 10 may be based on data of certain accumulated frequencies Le of the hydraulic pressure control learning, for example, data obtained by integrating data in individual business units that perform automatic vehicle allocation.

According to Embodiment 4, the progress degrees d1 of the hydraulic pressure control learning are determined based on the ratio between the actual learning frequency Le and the average value Leav of the learning frequencies Le of the same type vehicles as the selection target vehicles 10. According to the foregoing, it is possible to simply compare the progress degrees d1 of the hydraulic pressure control learning with each other, for example, even in a case where transitions from different shift stages to a shift stage are compared with each other.

Other embodiments of the disclosure will be described. In the subsequent description, the parts shared by the aforementioned embodiment will be designated by the same reference signs and the description thereof will be omitted.

Embodiment 5

Figures 11, 12:
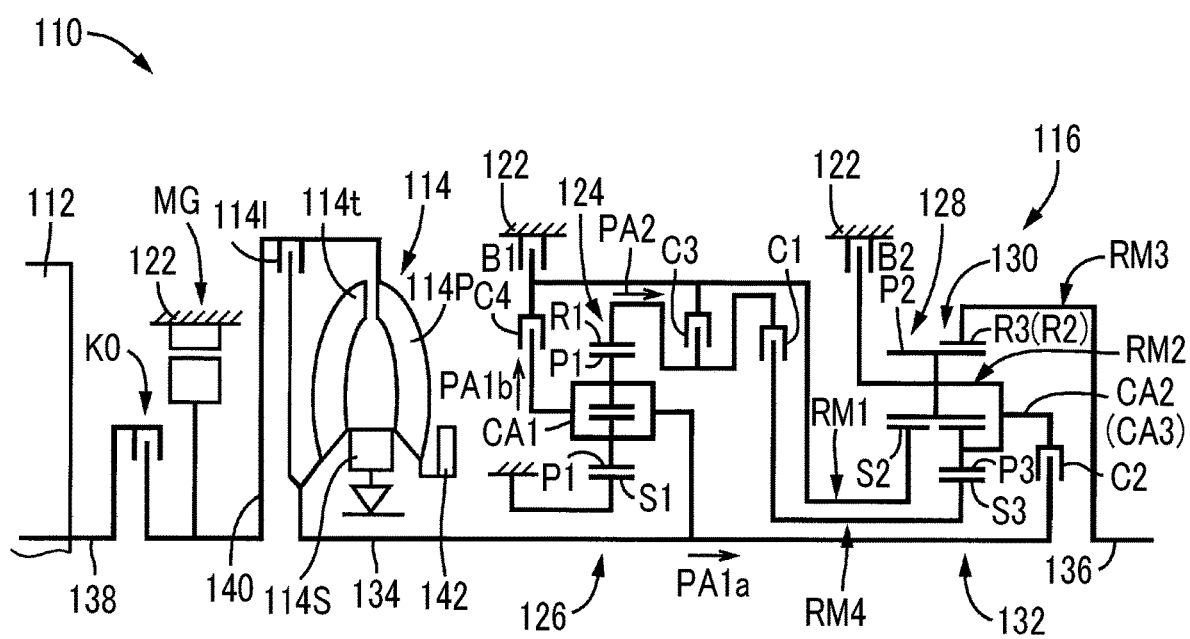
FIG. 11 is a skeleton view illustrating the configuration of a vehicular power transmission device of another hybrid vehicle to which the control device of the disclosure is applied.
FIG. 12 is an operation chart illustrating a combinational relationship between the shift operation of the transmission of FIG. 11 and the operation of engaging devices used for the shift operation.

FIG. 11 is a skeleton view illustrating the configuration of a power transmission device 110 used instead of the power transmission device 12 of the hybrid vehicle 10. Also in the power transmission device 110 of the hybrid vehicle 10, it is possible to determine the vehicles 10 to be allocated based on the progress degrees d1 of the hydraulic pressure control learning, similarly to Embodiment 1, Embodiment 2, Embodiment 3, and Embodiment 4. The electronic control unit 50 having the autonomous driving control means 74 and the hydraulic pressure control learning means 72 is the same as that of the aforementioned embodiments in the functions of the autonomous driving and the hydraulic pressure control learning, is illustrated using the same reference signs, and is not illustrated separately. The power transmission device 110 is configured to be substantially symmetrical to a centerline (axis), and a half below the axis is omitted in the skeleton view of FIG. 11. As illustrated in FIG. 11, the power transmission device 110 of Embodiment 5 is configured to include an engine 112, an electric motor MG a clutch K0 that is provided in a power transmission route between the engine 112 and the electric motor MG and controls power transmission in the power transmission route in accordance with an engaged state, a torque converter 114 in which an input member is coupled to the clutch K0, and an automatic transmission 116 provided in a power transmission route between the torque converter 114, and the drive wheels (not illustrated) and a differential gear unit. Therefore, in Embodiment 5, the torque converter 114 and the automatic transmission 116 correspond to a power transmission device including the clutch K0.

The clutch K0 is, for example, a multi-plate type hydraulic frictional engaging device, and power transmission in a power transmission route between a crankshaft 138 of the engine 112 and a front cover 140 of the torque converter 114 is performed by engaging (connecting) the clutch K0. By releasing the clutch K0, the power transmission in the power transmission route between the crankshaft 138 of the engine 112 and the front cover 140 of a torque converter 114 is cut off.

The torque converter 114 includes a pump impeller 114$p$ coupled to the crankshaft 138 of the engine 112 via the clutch K0, a turbine impeller 114$t$ coupled to the automatic transmission 116 via a turbine shaft equivalent to an output-side member, and a stator impeller 114$s$ provided between the pump impeller 114$p$ and turbine impeller 114$t$, and is a fluid type power transmission device that performs power transmission via a fluid. A lock-up clutch 114$l$ configured such that the pump impeller 114$p$ and the turbine impeller 114$t$ are integrally rotated by the engagement between the impellers is provided between the pump impeller 114$p$ and the turbine impeller 114$t$. The pump impeller 114$p$ is coupled to, for example, a mechanical hydraulic pump 142, such as a vane pump, the mechanical hydraulic pump 142 is driven with the rotation of the pump impeller 114$p$, and is configured such that a hydraulic pressure that becomes a source pressure of a hydraulic pressure control circuit or the like (not illustrated) is generated as described above.

The automatic transmission 116 includes a first shift part 126 configured using a double pinion type first planetary gear unit 124 as a main constituent, and second shift part 132 configured using a single pinion type second planetary gear unit 128 and a double pinion type third planetary gear unit 130 as main constituents, on a common axis within a transmission case (hereinafter referred to as a case) 122 serving as a non-rotating member attached to the vehicle body, and shifts the rotation of an input shaft 134 to output the shifted rotation from an output shaft 136. The input shaft 134 is a turbine shaft of the torque converter 114 in Embodiment 5.

The first planetary gear unit 124 includes a first sun gear S1, a plurality of pairs of pinion gears P1 that mesh with each other, a first carrier CA1 that supports the pinion gears P1 in a rotatable and revolvable manner, a first ring gear R1 that meshes with the first sun gear S1 via the pinion gears P1, and three rotating elements are constituted of the first sun gear S1, the first carrier CA1, and the first ring gear R1. The first carrier CA1 is coupled to the input shaft 134 and is rotationally driven, and the first sun gear S1 is integrally fixed to the case 122 in a non-rotatable manner. The first ring gear R1 functions as an intermediate output member, is deceleration-rotated with respect to the input shaft 134, and transmits the rotation to the second shift part 132. A route along which the rotation of the input shaft 134 is transmitted to the second shift part 132 at the same speed is a first intermediate output route PA1 along which the rotation is transmitted at a predetermined constant shift ratio (=1.0). The first intermediate output route PA1 includes a direct connection route PA1$a$ along which the rotation is transmitted from the input shaft 134 to the second shift part 132 without passing through the first planetary gear unit 124, and an indirect route PA1$b$ along which the rotation is transmitted from the input shaft 134 via the first carrier CA1 of the first planetary gear unit 124 to the second shift part 132. A route along which the rotation is transmitted from the input shaft 134 via the first carrier CA1, the pinion gears P1 disposed in the first carrier CA1, and the first ring gear R1, to the second shift part 132 is a second intermediate output route PA2 along which the rotation of the input shaft 134 is shifted (decelerated) at a larger shift ratio (>1.0) than the first intermediate output route PA1 and transmitted.

The second planetary gear unit 128 includes a second sun gear S2, a pinion gear P2, a second carrier CA2 that supports the pinion gear P2 in a rotatable and revolvable manner, and a second ring gear R2 that meshes with the second sun gear S2 via the pinion gear P2. The third planetary gear unit 130 includes a third sun gear S3, a plurality of pairs of pinion gears P2 and P3 that mesh with each other, a third carrier CA3 that supports the pinion gears P2 and P3 in a rotatable and revolvable manner, and a third ring gear R3 that meshes with the third sun gear S3 via the pinion gears P2 and P3. In the second planetary gear unit 128 and the third planetary gear unit 130, four rotating elements RM1 to RM4 are configured by coupling some constituents to each other. Specifically, a first rotating element RM1 is constituted of the second sun gear S2 of the second planetary gear unit 128. The second rotating element RM2 is configured by integrally coupling the second carrier CA2 of the second planetary gear unit 128 and the third carrier CA3 of the third planetary gear unit 130 to each other. The third rotating element RM3 is configured by integrally coupling the second ring gear R2 of the second planetary gear unit 128 and the third ring gear R3 of the third planetary gear unit 130 to each other. A fourth rotating element RM4 is constituted of the third sun gear S3 of the third planetary gear unit 130. In the second planetary gear unit 128 and the third planetary gear unit 130, the second ring gear R2 and the third ring gear R3 are constituted of a common member, and the second carrier CA2 and third carrier CA3 are constituted of a common member. The pinion gear P2 of the second planetary gear unit 128 is a Ravigneaux type planetary gear train that serves also as the second pinion gear of the third planetary gear unit 130.

The first rotating element RM1 (second sun gear S2) is selectively coupled to the case 122 via the first brake B1 and stopped in rotation, is selectively coupled to the first ring gear R1 (that is, the second intermediate output route PA2) of the first planetary gear unit 124, which is the intermediate output member, via the third the clutch C3, and is selectively coupled to the first carrier CA1 (that is, the indirect route PA1$b$ of the first intermediate output route PA1) of the first planetary gear unit 124 via the fourth clutch C4. The second rotating element RM2 (the second carrier CA2 and the third carrier CA3) is selectively coupled to the case 122 via the second brake B2 and stopped in rotation, and is selectively coupled to the input shaft 134 (that is, the direct connection route PA1$a$ of the first intermediate output route PA1) via the second clutch C2. The third rotating element RM3 (the second ring gear R2 and the third ring gear R3) is integrally coupled to the output shaft 136 so as to outputs the rotation thereof. The fourth rotating element RM4 (third sun gear S3) is coupled to the first ring gear R1 via the first clutch C1.

FIG. 12 is an operation chart (engagement operation table) illustrating the combination of operation of the hydraulic engaging devices when the gear stages (shift stages) are established in the automatic transmission 116. In FIG. 12, "O" represents an engaged state and blank represents a released state. As mentioned above, in the automatic transmission 116, a plurality of shift stages (gear stages) having different shift ratios γ, for example, multi-stage shifts of eight forward stages are achieved by selectively engaging the first clutch C1, the second clutch C2, the third the clutch C3, the fourth clutch C4 (hereinafter simply referred to as clutches C unless particularly distinguished from each other), the first brake B1, and the second brake B2 (hereinafter simply referred to as brakes B unless particularly distinguished from each other) with each other. The shift ratios that are different from each other for the individual gear ratios are appropriately determined depending on the individual shift stages of the first planetary gear unit 124, the second planetary gear unit 128, and the third planetary gear unit 130.

According to Embodiment 5, in the vehicle allocation system 8 that allocates, through the autonomous driving, the allocation vehicle 11 selected from the selection target vehicles 10 having the hydraulic pressure control learning means 72 that performs the hydraulic pressure control learning and the autonomous driving control means 74 that performs the autonomous driving, in the power transmission device 110 in which the shift stages are formed by combination of the clutches C and the brakes B, a vehicle in which the progress degree d1 of the hydraulic pressure control learning is low is selected as the allocation vehicle 11 from the selection target vehicles 10 based on the progress degrees d1 of the hydraulic pressure control learning before the vehicle allocation. According to the foregoing, it is possible to make the progress degrees d1 of the hydraulic pressure control learning of the power transmission device 110 for suppressing a shock at the time of shift more equal to each other between vehicles and it is possible to improve the progress degrees d1 of the hydraulic pressure control learning in a short time as compared to the related art.

In the above embodiments, vehicles 10, 110 include the electric motors M1, M2, MG as driving power sources other than the engine 15 and the engine 112. However, the disclosure is not particularly limited to this. For example, even in vehicles that have solely internal combustion engines, such as gasoline and diesel engines, as driving power sources without having the electric motors M1, M2, MG, the same effects can be expected in a case where vehicle allocation is performed based on the progress degrees of the hydraulic pressure control learning. In vehicles that perform the hydraulic pressure control learning in a gear stage even in electric automobiles that have solely the electric motors M1, M2, and MG as driving power sources, the same effects can be expected.

The above description is merely embodiments, and the disclosure can be implemented in forms to which various changes and improvements are added based on the knowledge of a person skilled in the art.

What is claimed is:

1. A vehicle allocation system for allocating, through autonomous driving, an allocation vehicle selected from a plurality of selection target vehicles, each of the plurality of selection target vehicles includes an electronic controller configured to perform hydraulic pressure control learning and autonomous driving control of a power transmission device in which a plurality of shift stages are established by combination of a plurality of hydraulic engaging devices, the vehicle allocation system comprising
at least one processing circuitry configured to select a first vehicle of the selection target vehicles as the allocation vehicle, the first vehicle having a first progress degree of the hydraulic pressure control learning lower than a second progress degree of the hydraulic pressure control learning of a second vehicle of the selection target vehicles, based on the first progress degree of the hydraulic pressure control learning and the second progress degree of the hydraulic pressure control learning before vehicle allocation.

2. The vehicle allocation system according to claim 1, wherein the at least one processing circuitry is configured to, when an increased frequency of the hydraulic pressure control learning predicted in a scheduled traveling route is determined to be equal to or less than a predetermined value, preferentially allocate the second vehicle of the selection target vehicles as the allocation vehicle, the second vehicle having the second progress degree of the hydraulic pressure control learning higher than the first progress degree of the hydraulic pressure control learning of the first vehicle.

3. The vehicle allocation system according to claim 1, wherein
the at least one processing circuitry is configured to preferentially allocate a third vehicle of the selection target vehicles as the allocation vehicle, the third vehicle having a third progress degree of the hydraulic pressure control learning in a predetermined shift in high-speed traveling is lower than the first progress degree of the hydraulic pressure of the first vehicle of the selection target vehicles, when the high-speed traveling is determined to be included in a scheduled traveling route, and
the high-speed traveling is traveling in which the third vehicle travels at a high speed equal to or more than a predetermined speed.

4. The vehicle allocation system according to claim 1, wherein the at least one processing circuitry is configured to preferentially allocate a fourth vehicle of the selection target vehicles as the allocation vehicle, the fourth vehicle having a scheduled traveling distance to a vehicle allocation destination shorter than a scheduled traveling distance to the vehicle allocation destination of the first vehicle of the selection target vehicles, when a fourth progress degree of the hydraulic pressure control learning of the fourth vehicle is determined to be the same as the first progress degree of the hydraulic pressure control learning of the first vehicle.

5. The vehicle allocation system according to claim 1, wherein the at least one processing circuitry is configured to determine the progress degrees of the hydraulic pressure control learning based on a ratio of an actual learning frequency and a preset learning frequency.

6. The vehicle allocation system according to claim 1, wherein the at least one processing circuitry is configured to determine the progress degrees of the hydraulic pressure control learning based on a ratio of an actual learning frequency and an average value of learning frequencies of the same type vehicles as the selection target vehicles.

7. The vehicle allocation system according to claim 1, wherein the electronic controller is configured to suppress a shock, caused by engagement change of the plurality of hydraulic engaging devices, based on the hydraulic pressure control learning.

8. The vehicle allocation system according to claim 1, wherein the at least one processing circuitry is configured to allocate the allocation vehicle to a user.

* * * * *